United States Patent [19]
Fan et al.

[11] Patent Number: 5,322,621
[45] Date of Patent: Jun. 21, 1994

[54] EQUIPMENT FOR TREATING SEWAGE BY BIOLOGICAL OXIDATION

[75] Inventors: Mingmao Fan; Fenglin Yang; both of Dalian, China

[73] Assignee: Dalian Petro-Chemical Company of China Petro-Chemical Corporation, Liaoning Province, China

[21] Appl. No.: 22,358

[22] Filed: Feb. 25, 1993

[30] Foreign Application Priority Data

Feb. 26, 1992 [CN] China .................. 92101296.9

[51] Int. Cl.⁵ .............................................. C02F 3/30
[52] U.S. Cl. ................................. 210/151; 210/202; 210/259; 210/261; 210/615; 210/617; 210/903
[58] Field of Search .............. 210/150, 151, 202, 220, 210/255, 258, 259, 261, 262, 304, 512.1, 615, 630, 903, 617

[56] References Cited

U.S. PATENT DOCUMENTS

| 2,352,901 | 7/1944 | Klein | 210/151 |
| 3,700,590 | 10/1972 | Burton | 210/150 |
| 3,957,642 | 5/1976 | Oldham et al. | 210/151 |
| 5,147,547 | 9/1992 | Savall et al. | 210/150 |
| 5,211,844 | 5/1993 | Hattori et al. | 210/151 |
| 5,223,129 | 6/1993 | Hsieh | 210/150 |

*Primary Examiner*—Cynthia L. Nessler
*Attorney, Agent, or Firm*—Burns, Doane, Swecker & Mathis

[57] ABSTRACT

An equipment for treating sewage, comprises a horizontal plate with a water sinking hole dividing the equipment into two portions: an upper portion of biofilter and a lower portion of contact oxidation pond. Within such equipment, a two-stage sewage biochemical treatment is accomplished. The equipment of the present invention has the advantages of less land occupation, less energy consumption, higher pollutant removing rate, higher shock resistance, easy management, no excess sewage and waste gas being drained off and less secondary pollution.

11 Claims, 1 Drawing Sheet

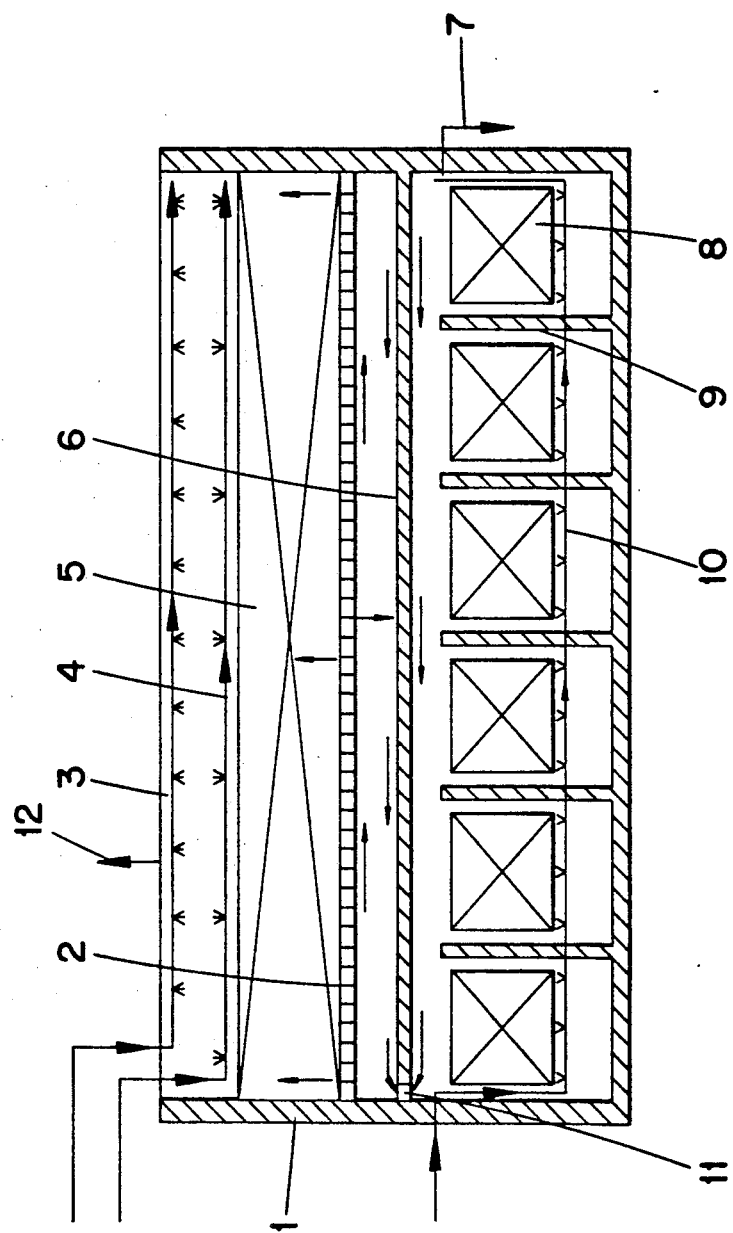

EQUIPMENT FOR TREATING SEWAGE BY BIOLOGICAL OXIDATION

FIELD OF THE INVENTION

The present invention relates to an equipment for treating sewage, especially an equipment for treating sewage by biological oxidation.

BACKGROUND OF THE INVENTION

Nowadays, most of the industrial and living sewage from petroleum refineries and chemical plants are treated with activated sludge process, which leads to lots of residual sludge, easy sludge dilation, difficulty in operation and management, high operation cost and larger land being occupied as well. In recent years, a biofilter treatment process is adopted for treating sewage by many enterprises both domestic and abroad. But it can only be operated in low organic burden because of its low sludge removing rate. Some plants adopt a combined biofilter-contact oxidationactivated sludge series process, which still has the following disadvantages, such as occupying large land, high running cost and complicated operation et al.

OBJECT OF THE INVENTION

The object of the present invention is to develop an equipment for treating various sewage, including mixed sea and fresh water sewage, with the advantages of smaller land occupation, higher treatment efficiency, lower energy consumption, easier management and lower cost of operation.

SUMMARY OF THE INVENTION

The equipment for treating sewage in accordance with the present invention includes a sewage inlet pipe line, a flushing water pipe line and an air-out pipe line disposed on the upper portion of said equipment, an air inlet pipe line and an water outlet pipe line disposed on the lower portion of said equipment; a horizontal water-collecting plate with a water sinking hole disposed therein dividing the said equipment into two portions, an upper portion above said water-collecting plate which is called biofilter and a lower portion below said water-collecting plate which is called contact oxidation pond, and a screening plate above and parallel to the water-collecting plate, ceramic flexible fillings being packed into the biofilters which are over the said screening plate, a few baffle walls being disposed in the contact oxidation pond below the water-collecting plate, ceramic flexible fillings being also packed into the said contact oxidation pond.

The sewage to be treated is introduced into the biofilter through the sewage inlet pipe line. After bio-treatment and percolation via the screening plate, it is collected at one end of the collecting-plate where a sinking hole allows it flowing to the contact oxidation pond. The treated water drains off directly from the pond. Air is forced into the contact oxidation pond from its bottom via an air-blower, passing through the sinking hole and then enter the biofilter and is finally removed out from the top of the equipment. A few baffle walls are disposed in the contact oxidation pond, which can prolong the flow path of sewage, and make an obvious gradient of pollutant content in the equipment for treating sewage of the present invention. The full treated water is then drained off from the outlet pipe line.

According to the present invention, the walls of the equipment, the screening plate and water collecting plate disposed in the biofilter, and baffle walls disposed in the contact oxidation pond are all made of armored concrete.

The equipment for treating sewage of the present invention is a two-stage biochemical treatment equipment in which sewage is treated: the upper biofilter is a pretreating device and the lower contact oxidation pond is a deeper treating device. The excess air in the contact oxidation pond passes through the upper biofilter and makes forced ventilation in the upper biofilter, and then drains off from the upper biofilter. In this way, not only an increased oxygen utility rate, but also an increased biofilter efficiency is reached. Meanwhile the detrimental materials in the waste gas may be absorbed by the sewage in the biofilter when passing through it and be decomposed by biological oxidation to reduce the secondary pollution.

The equipment for treating sewage in accordance with the present invention has the following advantages: smaller land occupation, higher efficiency, better shock resistance, easier management, lower cost, higher pollutant removal rate as well as no excess of activated sludge being drained. It can be used for treating oil-containing sewage from petroleum refineries. When the feeding sewage has a sulfur compounds content equal to or lower than 200 mg/l, volatile phenol content equal to or lower than 200 mg/l and petroleum content equal to or lower than 60 mg/l, the corresponding pollutant contents in the treated stream reduce to lower than 1 mg/l, 1 mg/l and 5 mg/l respectively after treatment.

The equipment of the present invention can treat the sewage not only from petroleum refinery but also from chemical, dye and other plants.

BRIEF DESCRIPTION OF THE DRAWING

FIG. 1 is a schematic internal structure of the tower for treating sewage by biological oxidation of the present invention.

DETAILED DESCRIPTION OF THE INVENTION

An embodiment of the present invention is further illustrated referred to the drawing.

In FIG. 1, 1 represents the walls of the tower for treating sewage by biological oxidation; 2 represents the screening plate; 3 represents the flushing water pipe line; 4 represents the sewage inlet pipe line; 5 represents the biofilter; 6 represents the water-collecting plate; 7 represents the outlet of water; 8 represents the contact oxidation pond; 9 represents the baffle walls; 10 represents the air-inlet pipe line; 11 represents the water sinking hole; 12 represents the air-out pipe line.

The sewage to be treated is introduced into biofilter 5 via sewage inlet pipe 4. The sewage after primary biotreatment is percolated through screening plate 2, and is collected at one end of water-collecting plate 6, and then falling into contact oxidation pond 8 via water sinking hole 11. Because of the function of baffle walls 9 in the pond, the pollutant content in the sewage has an obvious gradient, the treated water drains off finally from water outlet 7 after the secondary bio-chemical treat-ment in the contact oxidation pond.

Besides a sewage inlet line, a flushing water pipe line 3 is also disposed in the said biofilter. When the tower for treating sewage has been running for a certain period, it is flushed with plenty of fresh water for facillating the pull-out of the bio-membrane from the fillings packed in the biofilter, for the renew of the bio-membrane and for the removal of the bio-membrane to prevent clogging of the biofilter.

The compressed air enters contact oxidation pond 8 via air inlet pipe line 10, then comes up to the biofilter through water sinking hole 11 and finally exits via air outlet 12 disposed at the top of the tower.

The walls and the other internal structure components of the tower are all made of armored concrete and the fillings are all made of ceramic flexible fillings.

What we claimed is:

1. An apparatus for treating sewage by biological oxidation, comprising:

outside walls;

an upper portion of said apparatus;

a lower portion of said apparatus, said lower portion including a contact oxidation pond;

a sewage inlet pipeline and a flushing water pipeline, each of which are disposed on the upper portion of the apparatus;

a water outlet pipeline disposed on the lower portion of the apparatus, said water outlet pipeline defining a means for exiting water and treated sewage introduced through the sewage inlet pipeline and the flushing water pipeline;

an air inlet pipeline disposed on the lower portion of the apparatus;

and an air out pipeline disposed on the upper portion of the apparatus, said air out pipeline defining a means for exiting air introduced through the air inlet pipeline;

a horizontal water collecting plate, said plate having a water sinking hole at one end thereof, and is arranged between said upper portion and said lower portion;

a screening plate disposed above and substantially parallel to said water collecting plate;

a biofilter disposed above said screening plate in said upper portion, said biofilter being charged with fillings; and a plurality of baffle walls disposed in the contact oxidation pond;

wherein said contact oxidation pond is charged with fillings.

2. The apparatus of claim 1, wherein the fillings in the contact oxidation pond are ceramic flexible fillings.

3. The apparatus of claim 1, wherein the outside walls, the screening plate, the water collecting plate, and the baffle walls are made of armored concrete.

4. The apparatus of claim 1, wherein the outside walls are made of armored concrete.

5. The apparatus of claim 1, wherein the screening plate is made of armored concrete.

6. The apparatus of claim 1, wherein the water collecting plate is made of armored concrete.

7. The apparatus of claim 1, wherein the baffle walls are made of armored concrete.

8. The apparatus of claim 1, wherein the water sinking hole and the water outlet pipeline are disposed on opposite sides of said lower portion.

9. The apparatus of claim 1, wherein the fillings in the biofilter are ceramic flexible fillings.

10. The apparatus of claim 9, wherein the fillings in the contact oxidation pond are ceramic flexible fillings.

11. The apparatus of claim 10, wherein the outside walls, the screening plate, the water collecting plate, and the baffle walls are made of armored concrete.

* * * * *